United States Patent
Bouchet

(10) Patent No.: US 6,820,040 B2
(45) Date of Patent: Nov. 16, 2004

(54) METHOD AND A SYSTEM FOR MANAGING A PERSONAL EVENT LOG SPECIFIC TO AN OPERATING ACTIVITY EXECUTED ON A HARDWARE PERIMETER OF COMPUTER RESOURCES, AND MEMORY IMPLEMENTED IN THE SYSTEM

(75) Inventor: Alain Bouchet, rue d'Hamelincourt (FR)

(73) Assignee: Bull S.A., Louveciennes (FR)

( * ) Notice: Subject to any disclaimer, the term of this patent is extended or adjusted under 35 U.S.C. 154(b) by 100 days.

(21) Appl. No.: 10/359,698

(22) Filed: Feb. 7, 2003

(65) Prior Publication Data

US 2003/0149800 A1 Aug. 7, 2003

(30) Foreign Application Priority Data

Feb. 7, 2002 (FR) .............................. 02 01519

(51) Int. Cl.[7] .......................... G06F 15/00; G06F 17/40
(52) U.S. Cl. ....................................... 702/187; 719/318
(58) Field of Search ............................... 702/186, 187; 719/318; 711/1, 100

(56) References Cited

U.S. PATENT DOCUMENTS

| 5,345,590 | A | | 9/1994 | Ault et al. |
|---|---|---|---|---|
| 6,047,353 | A | | 4/2000 | Vishlitzky et al. |
| 6,219,701 | B1 | * | 4/2001 | Hirata et al. ................ 709/223 |
| 6,434,619 | B1 | * | 8/2002 | Lim et al. ................... 709/229 |
| 6,542,932 | B1 | * | 4/2003 | Brinnand et al. ........... 709/229 |
| 2002/0124213 | A1 | * | 9/2002 | Ahrens et al. ................ 714/57 |
| 2002/0147645 | A1 | * | 10/2002 | Alao et al. .................... 705/14 |
| 2002/0194392 | A1 | * | 12/2002 | Cheng et al. ............... 709/318 |

* cited by examiner

Primary Examiner—John Barlow
Assistant Examiner—Demetrius Pretlow
(74) Attorney, Agent, or Firm—Miles & Stockbridge P.C.; Edward J. Kondracki

(57) ABSTRACT

A method of managing a personal event log specific to an operating activity executed on a multiple-cell computer platform comprises a step of recording the event in a common event log together with an identifier of the acrivity that is saving the event while an activity is saving an event; and prior to an activity consulting its personal event log, a step of reconstructing the personal event log from the common event log, said reconstruction step including an operation of selecting from the common event log only those events which are associated with the identifier of the activity in order to include those events in the personal event log reconstructed for said activity.

20 Claims, 4 Drawing Sheets

METHOD AND A SYSTEM FOR MANAGING A PERSONAL EVENT LOG SPECIFIC TO AN OPERATING ACTIVITY EXECUTED ON A HARDWARE PERIMETER OF COMPUTER RESOURCES, AND MEMORY IMPLEMENTED IN THE SYSTEM

CROSS REFERENCE TO RELATED APPLICATION

The subject matter of the subject invention is related to application Ser. No. 10/359,694 filed on Feb. 7, 2003, in the name of Alain BOUCHET, entitled "Method of Automatic Updating of An Access Path to the System Disk of a Hardware Perimeter of Computer Resources, System for Executing This Method and Memory Used in the System", the subject matter of which is incorporated herein in its entirety.

FIELD OF THE INVENTION

The invention relates to a method of managing a personal log of events containing events recorded by an operating activity being executed on a perimeter of computer resources configured on a multiple-cell computer platform.

More precisely, the method relates to multiple-cell computer platforms having a plurality of distinct computer resource perimeters that can be activated on the platform in succession or simultaneously.

BACKGROUND OF THE INVENTION

At present, one of the directions in which hardware and/or computer systems are progressing lies in maximizing the flexibility of configurable computer resources to the benefit of a user having considerably smaller computer resources available locally.

In present configurable or reconfigurable computer systems, as shown in FIG. 1, use is made of a multiple-cell platform PF of computer resources. The multiple-cell platform PF comprises a plurality of calculation cells $C_{kj}$ each comprising at least one central processor unit and local working memories, including a non-volatile random access memory (NVRAM). The working memories in each of the cells are suitable in particular for containing an event log in which there are recorded events that have taken place during the operation of the cell or of a group of cells. By way of example, these events can be hardware incidents or alarms that occur during operation of the cell, or they can be events that are recorded by an operating system as it executes on said cell. Such an event log is also referred to as a system event log (SEL).

In configurable or reconfigurable systems of the kind shown in FIG. 1, there are resources which are common to all of the cells of the platform. These common resources include mass memories, and in particular system hard disks and data hard disks. Data disks contain applications software (commonly referred to as "applications") comprising computer programs to be executed and/or data to be processed. Each disk system has an operating system suitable for managing the hardware resources of a cell or of a group of cells. In particular, each operating system is suitable for managing the event log of the cell or the group of cells on which it is executed. By way of example, in FIG. 1, the common resources comprise a data disk $DD_1$ containing an application $L_1$, a system disk $DS_1$ containing an operating system $OS_1$, a data disk $DD_2$ containing an application $L_2$, and a system disk $DS_2$ containing an operating system $OS_2$.

In the context of configurable or reconfigurable systems, the term "operating activity" applies to all of the software means needed to implement a function that a user of the system seeks to achieve. Examples of such functions include, for example: drawing up pay sheets and generating lists of customers to be contacted. An activity thus includes at least one operating system suitable for managing the hardware resources of the platform. The function desired by the user is generally not performed by the operating system alone, and an operating activity commonly includes, in addition, one or more applications for execution on the operating system to perform the function(s) desired by the user. In this case, an activity $A_1$ comprises the application $L_1$ and the operating system $OS_1$.

To maximize flexibility in such systems, common resources are connected to the platform PF via addressable interconnection means MI implementing a storage area network (SAN) architecture. The interconnection means MI are designed to give access to the common resources from any one of the cells or from any group of cells configured on the platform PF. Thus, a data disk may be accessed from a cell $C_{kj}$ in a given configuration of the platform PF, and subsequently by a cell $C_{kj+1}$ in the context of a different configuration of the platform. Such interconnection means MI are therefore suitable for enabling all of the cells of the platform to access the common resources without that requiring any kind of rewiring operation.

Finally, configurable or reconfigurable computer systems also comprise a management tool MT enabling a user to group computer hardware resources together as "perimeters" of computer resources $P_i$ for executing operating activities $A_i$. Each perimeter $P_i$ is made up of a group of cells $C_{kj}$ and a fraction of the common resources such as a data disk and at least one system disk. In such systems it is possible to define a plurality of perimeters $P_i$. For example, in FIG. 1, two perimeters $P_1$ and $P_2$ have been configured, both of which are configured to execute activity $A_1$. The perimeter $P_1$ as outlined in dotted lines comprises a first group of cells, the data disk $DD_1$ and the system disk $DS_1$. The perimeter $P_2$, as outlined in dot-dashed lines, comprises a second group of cells different from the first group of cells, the data disks $DD_1$, and the system disk $DS_1$.

When two perimeters such as the perimeters $P_1$ and $P_2$ in FIG. 1 share common hardware resources, such as the same system disk, in this case $DS_1$, they must be configured in succession on the same platform. Otherwise, they can be configured simultaneously on the platform PF.

Such systems correspond to systems or machines that are commonly referred to as "partition machines". Normally they make it possible to install and execute different operating activities $A_i$ simultaneously or successively in different perimeters of the platform. Nevertheless, such systems are not capable at present of allowing a user to restart the same activity in a perimeter other than the perimeter in which it was executed initially. Thus, for example, if the user seeks to restart activity $A_1$, not in perimeter $P_1$, but in perimeter $P_2$, then the data recorded in the event log by the activity $A_1$ while being executed on the perimeter $P_1$ is lost. The event log of perimeter $P_1$ is recorded in working memories that are local to the perimeter $P_1$ and it is not accessible from perimeter $P_2$. This loss of information on transfer of an activity from an original perimeter to a destination perimeter can lead to the activity functioning wrongly when it is executed on the new perimeter.

OBJECTS AND SUMMARY OF THE INVENTION

The invention seeks to remedy that drawback by proposing a method of managing a perimeter event log that is capable of allowing the same operating activity to be restarted on a perimeter other than the perimeter on which it was executed initially.

The invention thus provides a method as defined above for managing a personal event log containing events recorded by an operating activity, the method comprising:

while an activity is saving an event, a step of recording the event in a common event log together with an identifier of the activity that is saving the event; and prior to an activity consulting its personal event log, a step of reconstructing the personal event log from the common event log, said reconstruction step including an operation of selecting from the common event log only those events which are associated with the identifier of the activity in order to include those events in the personal event log reconstructed for said activity.

In the above-described method, regardless of the perimeter on which an activity is restarted, the events recorded by said activity in the log during earlier execution on another perimeter are not lost. The events recorded by the activity are recorded in association with an identifier of said activity in a common event log which is accessible from all of the configured or configurable perimeters on the platform. Thus, even if the activity is restarted subsequently on another perimeter different from the perimeter on which it was being executed beforehand, it still has access to the common event log. In addition, since the events it recorded in the common event log are associated with its own identifier, it is possible to select and return to said activity only those events which concern it, i.e. only those events which it has itself recorded. As a result, with respect to an event registered by or for an activity in the common event journal, it does not matter whether said activity is executed on one particular perimeter or on another.

According to other characteristics of a method of managing an event log in accordance with the invention:

the computer hardware resources of perimeters are capable of generating events, and the method further comprises a step of recording in the common event log an event that has been generated by a computer hardware resource together with an identifier of the resource that has caused the event, and the step of reconstructing a personal event log specific to an activity further includes an operation of selecting from the common event log only those events which are associated with the identifier of a computer hardware resource contained in the perimeter on which said activity is being executed in order to include those events in the personal event log reconstructed for said activity;

while an activity is saving an event, the method further comprises a step of recording in the common event log a scope attribute associated with said event and specifying the activities which are authorized to consult said event and/or the perimeters from which activities are authorized to consult said event, and the step of reconstructing a personal event log specific to an activity further includes an operation of selecting from the common event log only those events which are associated with a scope attribute authorizing said event to be consulted by the activity being executed and/or from the perimeter on which said activity is being executed in order to include those events in the personal event log reconstructed for said activity; and the method further comprises:

while an activity is sending an instruction to modify at least one event in its personal event log, a step of recording in a file said instruction in association with an identifier of the activity, which file is accessible by the activity from all of the perimeters of the platform; and prior to an activity consulting its personal event log, a step of executing the modification instruction applied to the personal event log as reconstructed for said activity during the reconstruction step.

The invention also provides a system for managing a personal event log specific to an operating activity while it is being executed, the system comprising:

a multiple-cell computer platform;

a management tool suitable for defining computer hardware resource perimeters and for activating said perimeters on the platform simultaneously or in succession, each perimeter comprising one or more calculation cells; and means for storing operating activities, each operating activity comprising at least one operating system suitable for managing the computer resources of the perimeter on which the activity is to be executed;

the system further comprising:

a memory containing a common event log suitable for storing the events recorded by all of the operating activities;

a module for recording events in the common event log, said events being generated by each operating activity and being associated with an identifier of the activity causing the event to be saved; and a reconstruction module for reconstructing a personal event log specific to an operating activity from a common event log, the reconstruction module including a selection submodule for selecting from the common event log only those events which are associated with the identifier of said operating activity in order to include those events in the personal event log reconstructed for said activity.

According to other characteristics of a system for managing an event log in accordance with the invention:

the personal event log specific to an operating activity contains events recorded by the computer hardware resources of the perimeter on which the activity is being executed, and the system further comprises a module for recording in the common event log an event generated by a computer hardware resource of the perimeter in association with an identifier of said resource, and the module for reconstructing a personal event log specific to an activity further comprises a submodule for selecting from the common event log only those events which are associated with an identifier of a computer hardware resource contained in the perimeter on which said activity is being executed, in order to include those events in the personal event log reconstructed for said activity;

the system further comprises a module for saving in the common event log a scope attribute associated with each event and specifying the activities which are authorized to consult said event and/or the perimeters from which the activities are authorized to consult said event, and the module for reconstructing a personal event log specific to an activity further comprises a submodule for selecting from the common event log only those events which are associated with a scope attribute that authorizes said event to be consulted by the activity being executed and/or from the perimeter on which the activity is being executed in order to include those events in the personal event log reconstructed for said activity; and the system also comprises:

a recording module for recording instructions to modify at least one event in the personal event log specific to an activity, said recording module being suitable for recording in the memory said modification instructions in association with an identifier of the activity that has generated the instruction; and a module for executing modification instructions recorded by an activity in the memory, said modification instructions being applied to the personal event log reconstructed for said activity by the reconstruction module.

The invention also provides a memory for storing information for use in a system of the invention for managing a personal event log, the memory containing a common event log containing a list of events saved by a plurality of different operating activities, each of said events being associated with an identifier for the activity which saved it.

According to other characteristics of an information storage memory in accordance with the invention:

the common event log also contains a list of events saved by computer hardware resources contained in perimeters, each of said events being associated with an identifier of the computer hardware resource that saved it; and the common event log contains a scope attribute associated with each saved event, said scope attribute indicating the activities which are authorized to consult said event and/or the perimeters from which activities are authorized to consult the event.

BRIEF DESCRIPTION OF THE DRAWINGS

The invention will better understood on reading the following description given purely by way of example and made with reference to the drawings, in which.

DESCRIPTION OF THE PREFERRED EMBODIMENT

Figure 2:
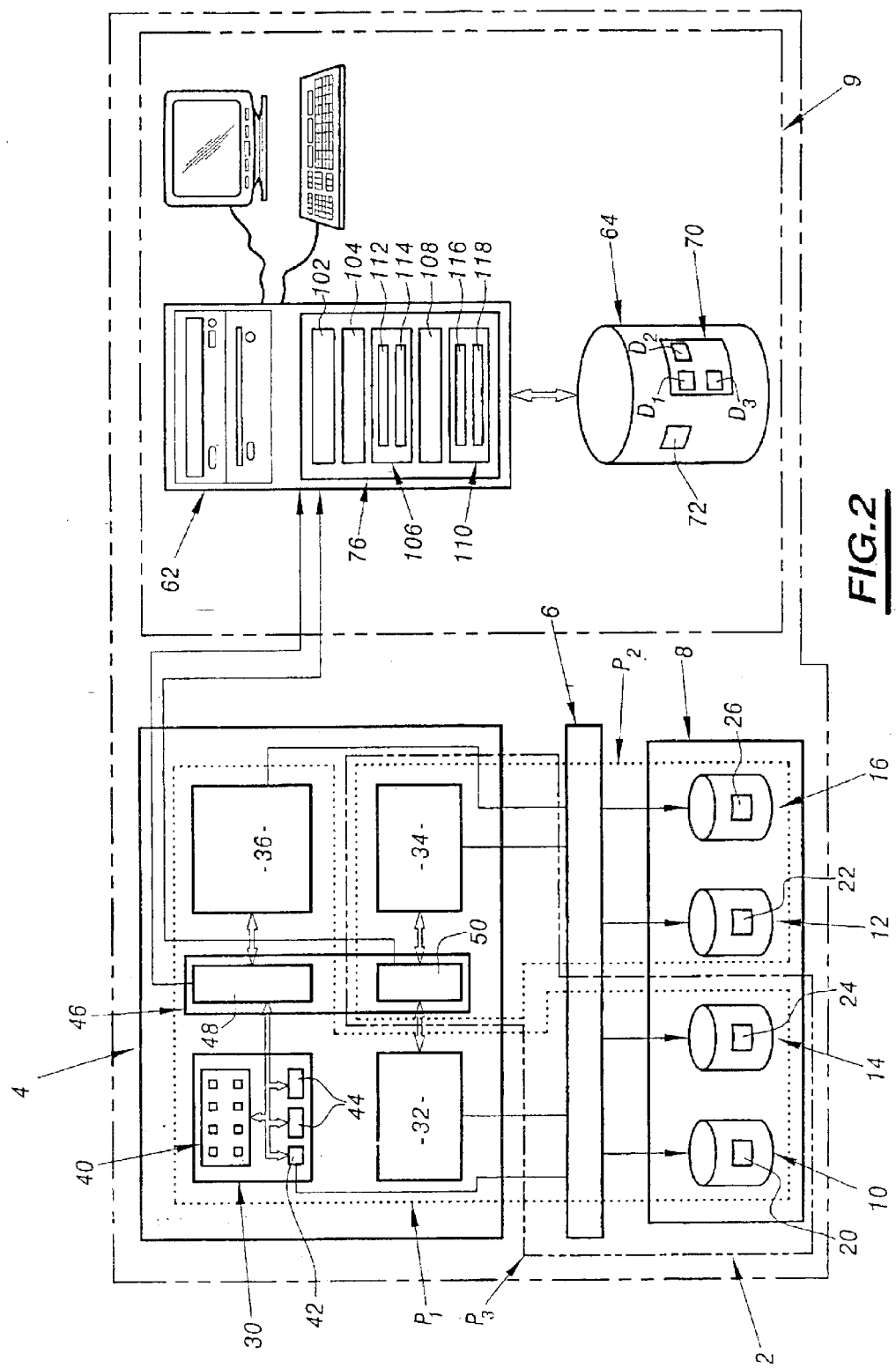
FIG. 2 is a diagram showing the hardware architecture of a system in accordance with the invention.

FIG. 2 shows a configurable system 2 of computer resources comprising a multiple-cell platform 4 connected via interconnection means 6 to common computer resources 8. The platform 4 is also connected to a management tool 9 of the platform 4.

In this case, by way of example, the common computer resources are constituted solely by mass memories. In this case, the mass memories comprise two data hard disks 10 and 12 and two system hard disks 14 and 16. The data disks 10 and 12 serve to contain applications together with the data that is to be processed. In this case, the data disk 10 contains an application 20 and the data disk 12 contains an application 22. These data disks 10 and 12 also contain data for processing. By way of example, the applications 20 and 22 are software for managing databases or software for managing hardware resources.

In this case, the system disks 14 and 16 contain respective operating systems 24 and 26. These operating systems 24 and 26 are suitable for running the hardware computer resources of the platform 4. Thus, each operating system provides the function of managing an event log by means of a set of instructions for controlling the event log. This function is run at the initiative of software running on the operating system, or else it is run at the initiative of the operating system itself. In this case, the set of instructions used is a standard set of instructions complying with the specification of the standard intelligent platform management initiative (IPMI) interface as defined by Intel. This specification defines both the hardware interface with which the platform 4 must be equipped, i.e., for example, information storage registers, and also the software interface, i.e., for example, the peripheral drivers with which the operating system must be provided. This set of instructions includes in particular an instruction enabling the event log to be consulted, an instruction for saving a new event in the event log, and an instruction for deleting the event log.

By way of example, a first operating activity $A_1$ is implemented when the application 20 is executed on the operating system 24. This activity $A_1$ thus comprises the application 20 and the operating system 24 taken together.

The multiple-cell platform 4 is subdivided into a plurality of calculation cells. In this case, the platform 4 has four calculation cells 30, 32, 34, and 36 that are identical. As a result only the cell 30 is described in detail.

The cell 30 is suitable, on its own or in cooperation with other cells, for executing the operating activities recorded in the common resources. For this purpose, this cell or group of cells is run by the operating system of the activity, as recorded in the common resources.

The cell 30 also comprises a central processor unit 40 connected via a data and address bus to an input/output card 42 and to local working memories 44. The data and address bus is also connected to a set 46 of cards providing an interface with the management tool 9 of the platform 4.

The central processor unit 40 serves to execute calculation operations. For this purpose, in the embodiment described herein, it comprises eight 64-bit microprocessors suitable for performing these calculation operations in parallel and simultaneously.

The input/output card 42 serves to exchange information between the common resources 8 and the cell 30.

The local working memories 44 include a unique cell identifier. For example, in this case the identifier is an order number enabling this cell 30 to be distinguished from the other cells of the platform 4. The identifiers of the respective cells 30, 32, 34, and 36 are noted herein as $C_1$, $C_2$, $C_3$, and $C_4$.

The set 46 of interface cards comprises, in this case, two interface cards 48 and 50. The card 48 is connected to the cells 30 and 36, while the card 50 is connected to the cells 32 and 34. These cards 48 and 50 are connected to the management tool 9. They are identical to each other and only the card 48 is described herein.

The card 48 is suitable for managing the hardware resources of the cells 30 and 36. For example, this card is suitable for directly detecting operating errors in the hardware components making up the cells 30 and 36 independently of the operating system executed on them. In this case, the card is adapted to send messages to the management tool 9, each message containing an event for recording in an event log. These events relate to the hardware resources of the cell 30 or 36. They are sent in association with the cell identifier. By way of example, an event might be an operating error or a technical incident that has occurred on a component of the cell 30 or 36.

These cards are also suitable for intercepting accesses made by the operating system to the hardware resources of the cells. For each cell, these cards have an IPMI hardware interface complying with the IPMI initiative specifications, in such a manner that the instructions for managing the event log of each cell as generated by the operating system it is running are sent to this IPMI hardware interface. In this case, the cards 48 and 50 are suitable for relaying immediately to the management tool 9 all event log management instructions intercepted by means of the IPMI interface. These instructions are sent to the management tool 9 in association with a unique identifier enabling the activity that issued the instruction to be identified.

The interconnection means 6 are suitable for connecting any one of the cells of the platform 4 to any one of the disks 10, 12, 14, and 16. Thus, because of the presence of the interconnection means 6, no rewiring operation is required in order to connect any one of the disks to any of the cells of the platform 4. These interconnection means are constituted, for example, by a dedicated data storage network complying with SAN architecture and built up using fiber channel switches as sold, for example, by the supplier Brocade Communications Systems, Inc., 1745 Technology Drive, San Jose, Calif. 95110, USA under the references SW 3800 or SW 2040. The management tool 9 is suitable for managing the configuration of the platform 4. For example, it is implemented using a computer 62 which is distinct from the platform 4, having a screen and a keyboard, and associated with memory 64.

The memory 64 contains a list of domains 70 and a common event log 72.

The list 70 contains the definition of a plurality of logical domains that might be activated on the platform 4. A logical domain combines both an identity file and a file defining a hardware perimeter of computer resources. The identity file contains a unique identifier for an operating activity to be executed together with attributes for saving the execution context of said activity. In particular, these saved attributes are intended to contain all of the configuration parameters needed for execution of the operating system of the activity so that the operating system can be executed with the same configuration parameters on any perimeter. This is how the operating system is made independent of the hardware resource perimeter on which it is or will be executed. These saved attributes include one for storing management parameters relating to a personal event log specific to the activity. This saved attribute is suitable, for example, for storing the instant at which the activity issued its most recent instruction to delete its personal event log. The identity file also contains information to specify which operating system is to be activated and optionally which application(s) is/are to be executed in order to perform the function desired by the user.

The file defining a perimeter contains a unique identifier for the perimeter and the definition of the hardware computer resources that need to be implemented in order to execute the operating activity corresponding to the activity identifier recorded in the identity file of said domain. For this purpose, a perimeter definition includes one or more identifiers of cells in the platform 4, at least one reference to the system disk containing the operating system to be executed, and in this case one or more references to data disks containing the application(s) to be executed and/or the data to be processed. By way of example, the list 70 comprises in this case three domains referenced $D_1$, $D_2$, and $D_3$. The domain $D_1$ contains the definition of a perimeter $P_1$ and an identity file $Id_1$. The perimeter $P_1$ defined in this example comprises cells 30, 32, and 36 of the platform 4, together with data disks 10 and system disks 14. The identity file $Id_1$ contains an identifier of the activity $A_1$, and identifiers of the application 20 and of the operating system 24. The domain $D_2$ contains a file defining a perimeter $P_2$ and an identity file $Id_2$. The perimeter $P_2$ defined in this example comprises the cell 34, the data disk 12, and the system disk 16. The identity file $Id_2$ contains an identifier of the activity $A_2$ and identifiers of the application 22 and of the operating system 26. The domain $D_3$ contains a file defining a perimeter $P_3$ and the identity file $Id_1$. The perimeter $P_3$ comprises the cell 34, the data disks 10, and the system disk 14.

Figure 1:
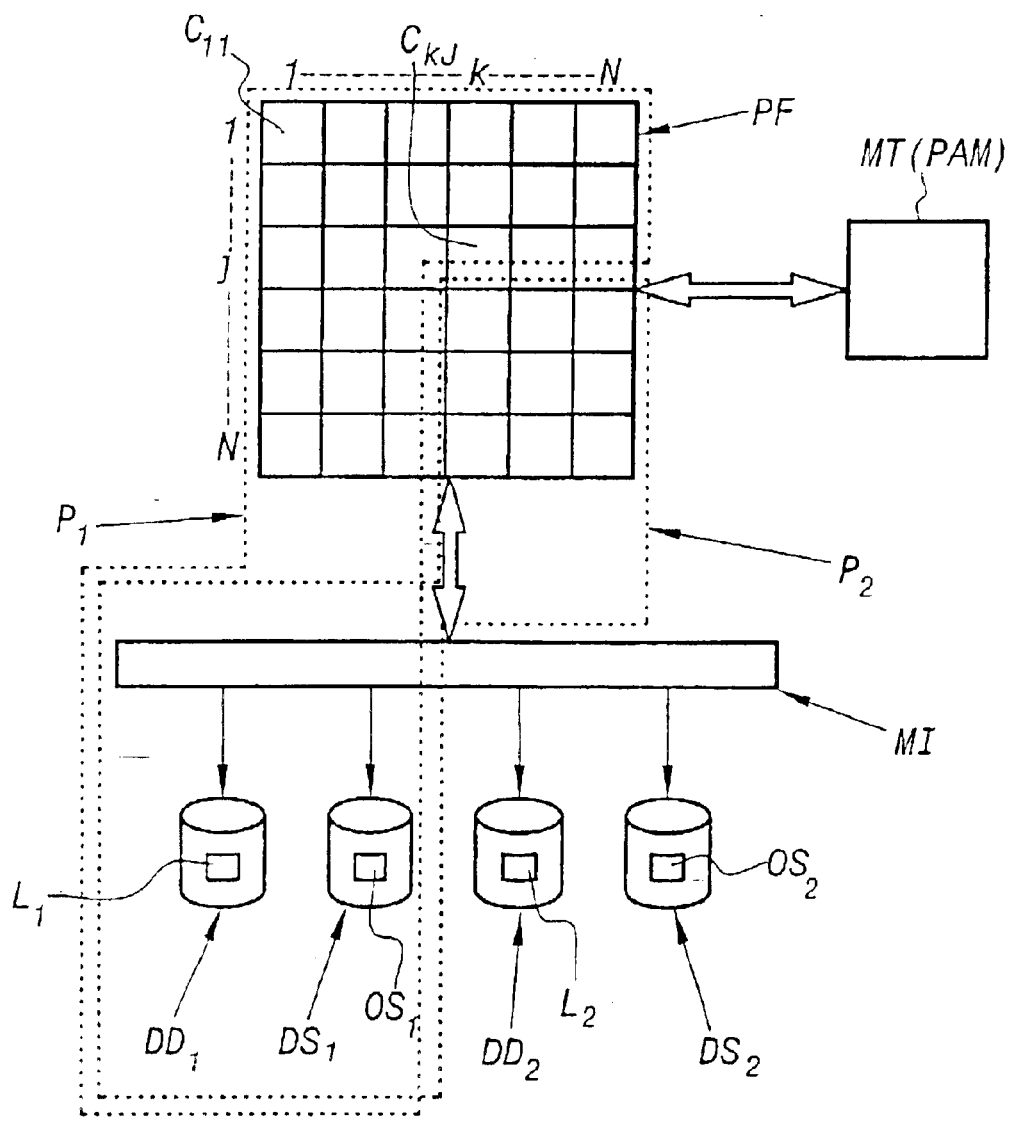
FIG. 1 is a diagram of a known multiple-cell platform.

The perimeters $P_1$ and $P_2$ are represented diagrammatically by dotted lines in FIG. 1. The perimeter $P_3$ is represented by chain-dotted lines.

When a perimeter such as the perimeter $P_1$ comprising a plurality of cells is activated on the platform 4, a single one of those cells is a master cell, while the other cells within the same perimeter are slave cells. Thus, this set of cells acts in fact as a single microprocessor unit. The master cell is determined automatically, for example, by selecting the cell within the perimeter having the lowest order number. In such a situation, only the IPMI hardware interface associated with the master cell is used for sending to the management tool 9 events recorded by the activity executed in the multiple-cell perimeter.

Figure 3:
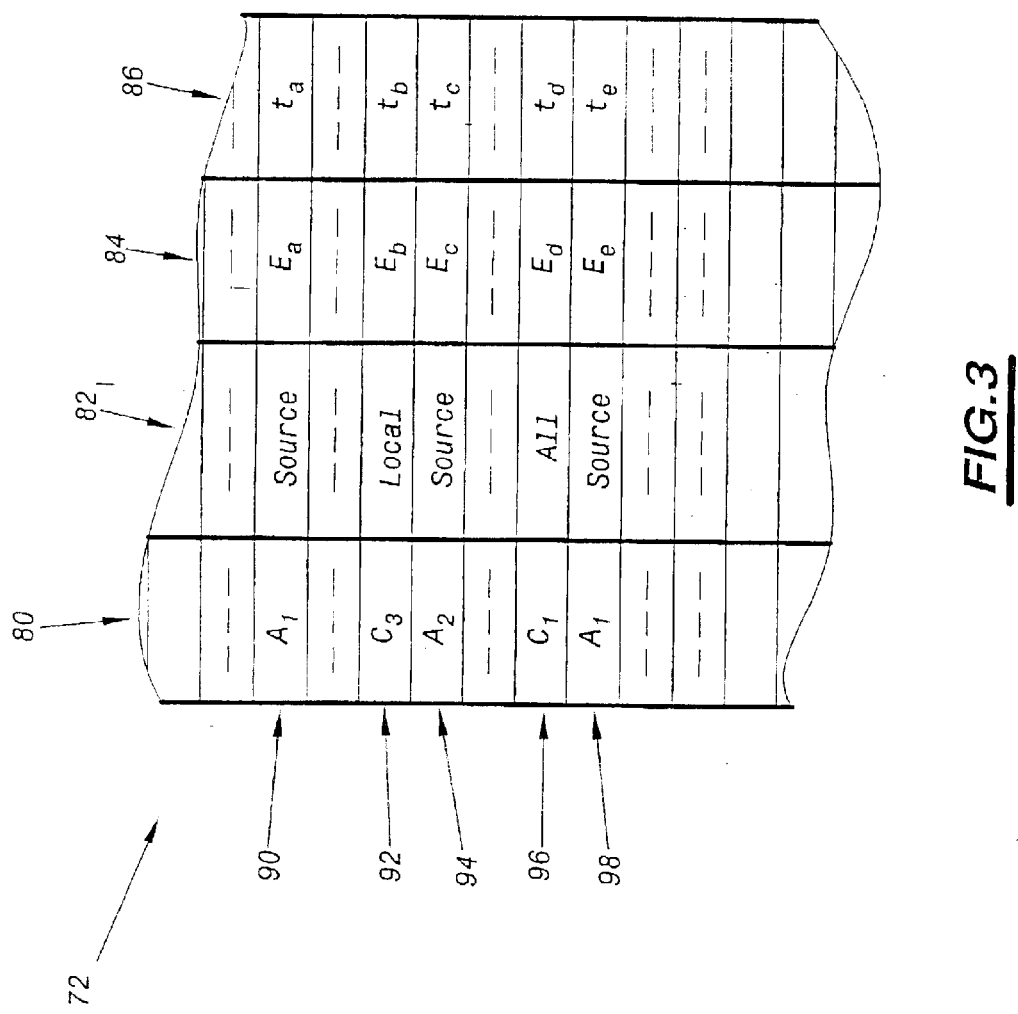
FIG. 3 shows an example of a common event log implemented in the system of FIG. 2.

The common event log 72 is suitable for containing all of the events recorded by each of the activities being executed or that have been executed on a perimeter configured on the platform 4. In this case, the events are received via the IPMI interface of the card 48 or 50. In addition, the common event log 72 is also suitable for containing all of the events generated by the hardware resources of the cells of the platform 4, i.e. events detected directly by the cards 48 or 50 and transmitted directly to the management tool without passing via the IPMI interface. For this purpose, in the embodiment described herein, and as shown in FIG. 3, the log 72 is constituted by a table in a database. The table comprises four columns 80, 82, 84, and 86. Column 84 is for containing the recorded event and column 86 is for recording the instant at which said event occurred. Column 80 is for containing the identifier of the activity or the hardware resource that recorded the event which appears in the same row. In the embodiment described herein, the hardware resource identifier is the identifier of the cell containing the resource. Thus, in the description below, it is assumed that the most elementary element of the system 2 capable of recording an event in the common log 72 is a cell. Column 82 is for containing a scope attribute specifying the perimeters or activities which are authorized to consult the event recorded in the same row. In this case, this attribute can take three values:

"Source", i.e. only the activity which recorded the event is entitled to consult the event;

"Local", i.e. only the activity being executed on a perimeter containing the cell that recorded the event is entitled to consult it; and "All", i.e. the event can be consulted by any activity regardless of the perimeter on which it is being executed.

By way of example, the data occupying five lines 90 to 98 of the table is shown. The content of these lines is described in greater detail below with reference to FIG. 4. Dashed lines in the table occupy rows that are not shown.

The computer 62 has management software 76. This software operates under the control of an operator to define and activate new logical domains in the system 2.

For this purpose, the software 76 includes a module 102 for defining new domains and a module 104 for activating domains. The module 102 is suitable under the control of an operator for defining new domains and for recording them in the list 70. Thus, the module 102 is for use by the operator to create new perimeter definition files and new identity files. This module is also suitable for enabling the operator to associate a perimeter definition file with an identity file in order to form a new logical domain.

The module 104 is adapted to enable the operator to select from the list 70 a domain that is to be activated on the platform 4. Such domain activation consists firstly in configuring on the platform 4 the perimeter as defined in the selected domain, and secondly in automatically launching on the configured perimeter the activity that corresponds to the identity file contained in the domain. In addition, the module 104 is suitable for enabling the operator to deactivate one or more domains currently being executed on the platform 4.

The management software 76 is also suitable for automatically saving in the log 72 events sent by the interface cards 48 and 50. For this purpose, the software includes a module 106 for saving events in the log 72, a module 108 for recording management parameters of a personal event log, and a module 110 for reconstructing a personal event log.

The module 106 is suitable for saving in the log 72 all of the events sent to the management tool 9 by the activities being executed or the cells that are activated. For this purpose, the module 106 includes a submodule 112 for determining the scope of an event it has received and a submodule 114 for recording a new row in the log 72.

The submodule 112 is adapted to determine which scope attribute value is to be recorded in column 82 of the log 72 for this event. This submodule is therefore suitable for determining in respect of each event that is to be recorded which are the activities and/or the perimeters that are to be authorized to consult the event. In the simplified embodiment described herein, the submodule 112 is associated with a list containing all kinds of event that might arise and need to be consultable by all activities regardless of their perimeter.

The submodule 114 is suitable for determining the identifier of the activity or the cell that has sent the event. It is also suitable for recording a new row in the log 72. The new line contains the event that has been sent, the identifier of the sender, the time and date of the event, and the scope attribute value as determined by the submodule 112 in respect of the event.

The module 108 is suitable for recording the management parameters of a personal event log specific to an activity in the identity file associated with the activity. Thus, for example, the module 108 is suitable in this case for recording the time and date of the most recent instruction to delete the personal event log of an activity in the saved attribute provided for this purpose in the identity file of that activity.

The module 110 serves to reconstruct or restore a personal event log specific to each activity on the basis of the data stored in the log 72. For this purpose, it has a submodule 116 for selecting from the log 72 those events that are consultable by a given activity. In this case, the events are those events which are associated with the identifier of the activity, those events which are associated with the identifier of a cell contained in the perimeter on which the activity is being executed, and those events having a scope attribute with the value "All".

The module 110 also has a submodule 118 for activating management parameters of the personal event log reconstructed by the submodule 116. In particular, this submodule 118 is suitable for executing the most recent delete instruction saved in the identity file of the corresponding activity.

The method of operation of the system 2 is described below with reference to FIG. 4 for the particular case of the domains initially active on the platform 4 being the domains $D_1$ and $D_2$.

Figure 4:
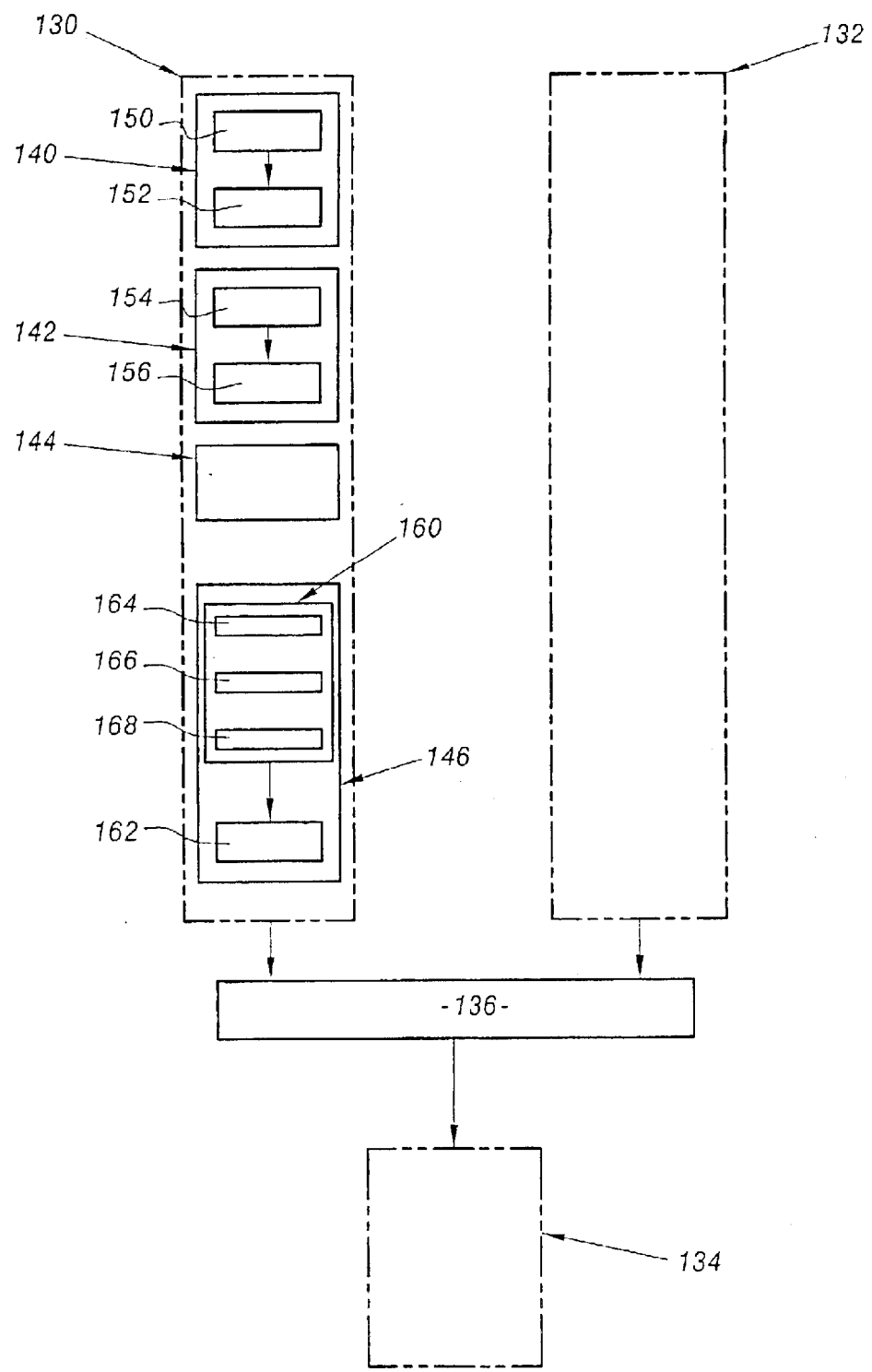
FIG. 4 is a flow chart for a method of managing a personal event log in accordance with the invention.

The method shown in FIG. 4 comprises, in chain-dotted lines, a stage 130 of executing activity $A_1$ on perimeter $P_1$, a stage 132 of executing activity $A_2$ on perimeter $P_2$, and a stage 134 of executing activity $A_1$ on perimeter $P_3$.

The stages 130, 132, and 134 correspond respectively to activating and executing the domains $D_1$, $D_2$, and $D_3$. The stages 130 and 132 are separated from the stage 134 by a step 136 of deactivating the domains $D_1$ and $D_2$ and then activating the domain $D_3$ on the platform 4. Hardware resources of the perimeter $P_3$ are common either with the perimeter $P_1$ or with the perimeter $P_2$, and as a result prior to configuring the perimeter $P_3$ on the platform 4, all of the necessary hardware resources must be released, which in this case corresponds to deactivating perimeters $P_1$ and $P_2$.

The stages 132 and 134 are similar to the stage 130. As a result only stage 130 is described in detail herein for the particular case of activity $A_1$ and of perimeter $P_1$.

The stage 130 comprises a step 140 of the activity $A_1$ saving an event, a step 142 of the cell 30 saving an event, and a step 144 of the activity $A_1$ sending an instruction to modify its personal event log, and a step 146 of the activity $A_1$ consulting the personal event log.

Step 140 occurs when activity $A_1$ sends an instruction via the IPMI interface of the card 48, said instruction being to save a new event. This step 140 is thus triggered by the software 76 of the management tool 9 receiving an event associated with an identifier indicating that this event was produced by activity $A_1$. During this step, the event received in this way is recorded in the log 72. This step mainly comprises a substep 150 of determining the scope attribute followed by a substep 152 of recording a new row in the log 72.

Substep 150 is implemented by the submodule 112 of the software 76. This submodule 112 begins by comparing the event received with the list of events that is associated therewith. If the event received is identical with one of the events contained in the associated event list, then the scope attribute is given the value "All". Otherwise, since the event was sent by activity $A_1$ it is automatically associated with a scope attribute having the value "Source".

Thereafter, during substep 152, the recording submodule 114 records a new row in the table constituting the log 72, said row containing the received event in column 84, the instant said event appeared in column 86, the value of the scope attribute in column 82, and the activity identifier in column 80. In this case, by way of illustration, activity $A_1$ records rows 90 and 98 in succession in the log 72 during stage 130. Row 90 contains the identifier $A_1$, the value "Source", event $E_a$, and instant $t_a$ respectively in columns 80, 82, 84, and 86. Row 98 also contains the identifier $A_1$, the value "Source", an event $E_e$, and an instant $t_e$, respectively in columns 80, 82, 84, and 86.

Step 142 occurs when the software 76 receives an event that is generated directly by the cell without going via the IPMI interface or the operating system. Such events relate, for example, to the operating state of one of the microcontrollers in the cell. During this step 142, a new event is recorded in the log 72. Step 142 includes a substep 154 of determining the value of the scope attribute associated with the received event, followed by a substep 156 in which the event is recorded in the log 72. Substep 154 is performed by the submodule 112 for determining the value of the scope attribute. During this substep, the received event is compared with the list associated with the submodule 112, and if this event is identical with one of the events contained in the list, then the scope attribute is given the value "All". Otherwise, the value of the scope attribute is set to "Local".

The substep 156 is similar to the substep 152 except that it is the identifier $C_1$ of the cell 30 that sent the event which is recorded in column 80 and not the identifier of the activity that sent the event. For example, the list associated with submodule 112 for determining scope includes an event $E_d$. In this case, the event $E_d$ is assumed to have occurred at instant $t_d$ in cell 30. Step 142 is then executed which leads to row 96 being recorded in the log 72. This row 96 contains the identifier $C_1$, the value "All", the event $E_d$, and the instant $t_d$ which are respectively recorded in columns 80, 82, 84, and 86.

When the activity $A_1$ sends an instruction to modify its personal log, step 144 is executed to record the modification instruction in the identity file associated with the activity. During step 144, the recording module 108 receives the instruction to modify the personal log as transmitted via the IPMI interface of the card 48. This received instruction is then stored in the saved attribute of the identity file $Id_1$ corresponding to the activity $A_1$ that sent the instruction. In this case, by way of illustration, the activity $A_1$ sends an instruction to delete the event log at instant $t_1$. Consequently, the recording module 108 stores in the identity file $Id_1$ the fact that a delete instruction was sent at instant $t_1$.

When the activity $A_1$ seeks to consult its personal event log, a consultation instruction is sent via the IPMI interface of the card 48 to the reconstruction module 110. The reconstruction module 110 then executes the step 146. This step 146 includes a substep 160 of reconstructing the personal event log specific to the activity $A_1$ followed by a substep 162 of executing the modification instructions applied to said reconstructed personal event log.

During substep 160, the selection submodule 116 of the module 110 selects from the log 72 those events which are consultable or accessible by the activity $A_1$. The selection submodule 116 does this by executing three selection operations 164, 166, and 168 either successively or simultaneously. Selection operation 164 consists in selecting from the log 72 only that set of events which is associated with the identifier of the activity consulting its personal event log, i.e. in this case the identifier $A_1$. This operation thus leads to rows 90 and 98 only of the log 72 being selected during stage 130. Selection operation 166 consists in selecting only those events which are associated with an identifier of one of the cells in the perimeter $P_1$ on which the activity consulting its personal event log is being executed, i.e. in this case one of the identifiers $C_1$, $C_2$, and $C_4$. This operation, in the present example, thus leads to row 96 of the log 72 being selected. Selection operation 168 consists in selecting from the log 72 only those events which are associated with an identifier different from the identifier of the activity consulting the personal event log and different from the perimeter on which said platforms is being executed, but associated with a scope attribute that allows the event to be consulted either by the activity $A_1$ or from the perimeter $P_1$. In this case, none of the rows in the log 72 as described above satisfies these three criteria. Although the scope attribute recorded in column 82 of line 96 is equal to "All", this row is not selected in order to reconstruct the personal event log of activity $A_1$ since it has already been selected in operation 166. At the end of these three selection operations 164, 166, and 168, only those rows which have been selected are made consultable or accessible by the activity $A_1$. These rows that are consultable or accessible by the activity $A_1$ constitute a reconstruction of its personal event log.

During substep 162, the instruction execution module 118 acts on the personal event log as reconstructed during substep 160 to apply the instructions for modifying the personal event log that are recorded in the identify file $Id_1$ of the activity $A_1$ which is consulting its personal event log. In this case, the submodule 118 applies to the personal event log reconstructed for the activity $A_1$ the delete instruction as recorded in the identify file $Id_1$. The instant $t_1$ is assumed in this case to be later than the instant $t_a$ and earlier than the instant $t_d$, so executing this delete instruction leads to deletion only of row 90 that has been selected for incorporation in the personal event log of the activity $A_1$. Thus, at the end of the selection substep 160 and of the substep 162 for executing modification instructions, the personal event log specific to the activity $A_1$ contains only rows 96 to 98. Only these events can be consulted by the activity $A_1$ when it is executed on the perimeter $P_1$. In other words, step 146 consists in filtering the log 72 so as to select therefrom only those events which concern the activity $A_1$ when it is executed on the perimeter $P_1$. Thus, the view given to the activity $A_1$ of the log 72 is restricted to events which relate to it and which comply with the management parameters that have been recorded in its own identity file.

Although steps 140, 142, 144, and 146 have been described in that order, they can naturally occur in any order. These steps are triggered either by the activity or by a cell within the perimeter.

During stage 132, the activity $A_2$ and the perimeter $P_2$ execute steps similar to the steps 140 to 146. These steps are therefore not described in detail herein for this particular case, where the activity identifier is now $A_2$ and the cell identifier is $C_3$. Thus, by way of example, it is assumed that during this stage 132, the activity $A_2$ triggers the recording of row 94 in the common log 72. This row 94 includes the identifier $A_2$, the value "Source", an event $E_c$, and an instant $t_c$ respectively recorded in columns 80, 82, 84, and 86. In addition, by way of example, the cell 34 triggers the recording of row 92 that includes the identifier $C_3$, the value "Local", an event $E_b$, and an instant $t_b$ respectively recorded in the columns 80, 82, 84, and 86.

Thus, at the end of stages 130 and 132, the common log contains simultaneously events that have been recorded by the activities $A_1$ and $A_2$, and also events that have been recorded from the perimeters $P_1$ and $P_2$.

During stage 134, the activity $A_1$ is being executed on the perimeter $P_3$. Again, during this stage 134, steps similar to steps 140 to 146 are triggered either by the activity $A_1$ or by the cell 34. These steps are therefore not described again.

However, in order to illustrate the operation of the system 2, an example of a step of consulting the common log 72 is described again below.

The log 72 is assumed to be in the state shown in FIG. 3 and the identifier $Id_1$ is assumed to include the delete instruction produced at instant $t_1$. The instant $t_1$ is assumed to be later than the instant $t_a$ and earlier than the instant $t_b$. Under such conditions, the step of reconstructing a personal log specific to the activity $A_1$ leads to rows 90, 92, 96, and 98 being selected from the log 72. Rows 90 and 98 contain the activity identifier $A_1$ in column 80, row 92 contains cell identifier $C_3$ in column 80, and row 96 contains a scope attribute equal to "All".

Thereafter, the substep of executing the modification instructions recorded in the identity file $Id_1$ lead to row 90 being deleted. Event $E_a$ took place at an instant earlier than the most recent delete instruction contained in the identify file $Id_1$. Thus, the personal event log ends up comprising only rows 92, 96, and 98, and only events that are consultable by the activity $A_1$ while it is being executed on the perimeter $P_3$.

The system 2 thus enables an activity, while it is being executed on a current perimeter, to find all of the events that it has recorded, regardless of the perimeter on which it was being executed previously. In this way, when an activity is transferred from a first perimeter to a second perimeter, events that were recorded while it was executing on the first perimeter are not lost. For example, row 98 is consultable by activity $A_1$ while it is executing on perimeter $P_3$.

The embodiment described herein presents the advantage that an event recorded by a cell is accessible from all of the perimeters containing the cell. Thus, all of the information relating to a perimeter is incorporated in the personal event log of activities executed on the perimeter.

The management parameters of the personal event log specific to any particular activity are recorded by the system 2 in a memory which is accessible from all of the perimeters, and the system executes them when a personal event log is being consulted. Thus, the personal event log returned to each activity complies with its own management parameters, regardless of the perimeter on which it has been or is to be executed. For example, when transferring activity $A_1$ from perimeter $P_1$ to perimeter $P_3$, row 90 which was deleted while it was executing on perimeter $P_1$ does not become available again while it is being executed on perimeter $P_3$.

If an event recorded by a given cell is of interest to all of the configured perimeters and/or all of the activities being executed or that might be executed, then it is incorporated in all of the personal event logs of the activities that are executed. For example, although event $E_d$ (row 96) was recorded by cell 30, this event can be consulted by activity $A_1$ while it is being executed on perimeter $P_3$. Thus, by means of a scope attribute, for example, events of general interest can easily be made available to all of the configured perimeters or to all of the executed activities.

The value of the scope attribute is not restricted to the three values described herein. By way of example, this attribute may be a list comprising a plurality of activity identifiers and/or perimeter identifiers that are authorized to consult the corresponding event.

The common event log 72 is described above as being in the form of a table in a database. In a variant, the common event log comprises one file for each activity presently being executed or that has been executed on the platform 4. Such a file contains an activity identifier, e.g. in its file name, together with all of the events that have been recorded by the activity. In addition, the common event log also comprises one file per presently configured perimeter or perimeter that has been configured on the platform 4. This perimeter file includes a perimeter identifier, for example in its file name, and all of the events recorded by cells in the perimeter. During the reconstruction substep, a personal event log is delivered to an activity by associating the recordings contained in the file having the identifier of said activity with those contained in the file having the identifier of the perimeter on which the activity was executed.

In a variant, the management tool 9 which is described above as being distinct from the platform 4 is integrated in the hardware of said multiple-cell computer platform.

In a variant, the identifier of the hardware resource that has recorded an event in the given common event log 72 is the identifier of the hardware component contained in a cell. This variant also has a correspondence table suitable, for each identifier of a hardware component, for specifying which is the cell that contains said component and thus which is the perimeter that contains it.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

I claim:

1. A method to managing a personal event log specific to an operating activity, wherein the log contains events recorded by said operating activity while the operating activity is being executed on a perimeter of computer hardware resources configured on a multiple-cell computer platform, each operating activity containing at least one operating system suitable for managing the computer resources of the perimeter on which the operating activity is to be executed, and the multiple-cell computer platform having a plurality of distinct computer hardware resource perimeters suitable for being activated in succession or simultaneously on the platform, the method comprising:

while an activity is saving an event, a step of recording the event in a common event log together with an identifier of the activity that is saving the event; and prior to an activity consulting the personal event log, specific to the activity, a step of reconstructing the personal event log from the common event log, said reconstruction step including an operation of selecting from the common event log only those events which are associated with an identifier of the activity in order to include those events in the personal event log reconstructed for said activity.

2. A method according to claim 1, wherein the computer hardware resources to perimeters are capable of generating events, and the method further comprises a step of recording in the common event log an event that has been generated by a computer hardware resource together with an identifier of the resource that has caused the event, and wherein the step of reconstructing a personal event log specific to an activity further includes an operation of selecting from the common event log only those events which are associated with the identifier of a computer hardware resource contained in the perimeter on which said activity is being executed in order to include those events in the personal event log reconstructed for said activity.

3. A method according to claim 1, further comprising:

while an activity is saving an event, a step of recording in the common event log a scope attribute associated with said event and specifying the activities which are authorized to consult said event and/or the perimeters from which activities are authorized to consult said event, and wherein the step of reconstructing a personal event log specific to an activity further comprises selecting from the common event log only those events which are associated with a scope attribute authorizing said event to be consulted by the activity being executed and/or from the perimeter on which said activity is being executed in order to include those events in the personal event log reconstructed for said activity.

4. A method according to claim 1, further comprising:

while an activity is sending an instruction to modify at least one event in its personal event log, a step of recording in a file said instruction in association with an identifier of the activity, which file is accessible by the activity from all of the perimeters of the platform; and prior to an activity consulting the personal event log, specific to the activity, a step of executing the modification instruction applied to the personal event log as reconstructed for said activity during the reconstruction step.

5. A method according to claim 2, further comprising while an activity is saving an event, a step of recordinq in the common event log a scope attribute associated with said event and specifying the activities which are authorized to consult said event and/or the perimeters from which activities are authorized to consult said event, and wherein the step of reconstructing a personal event log specific to an activity further comprises selecting from the common event log only those events which are associated with a scope attribute authorizing said event to be consulted by the activity being executed and/or from the perimeter on which said activity is being executed in order to include those events in the personal event log reconstructed for said activity.

6. A method according to claim 2, further comprising while an activity is sendinq an instruction to modify at least one event in its personal event log, a step of recordinq in a file said instruction in association with an identifier of the activity, which file is accessible by the activity from all of the perimeters of the platform; and prior to an activity consulting the personal event log, specific to the activity, a step of executing the modification instruction applied to the personal event log as reconstructed for said activity during the reconstruction step.

7. A method according to claim 3, further comprising while an activity is sending an instruction to modify at least one event in its personal event log, a step of recording in a file said instruction in association with an identifier of the activity, which file is accessibile by the activity from all of the perimeters of the platform; and prior to an activity consulting the personal event log, specific to the activity, a step of executing the modification instruction applied to the personal event log as reconstructed for said activity during the reconstruction step.

8. A system for managing a personal event log specific to an operating activity while the operating activity is being executed, the system comprising:

a multiple-cell computer platform;

a management tool suitable for defining computer hardware resource perimeters and for activating said perimeters on the platform simultaneously or in succession, each perimeter comprising one or more calculation cells; and means for storing operating activities, each operating activity comprising at least one operating system suitable for managinq the computer resources of the perimeter on which the activity is to be executed;

the system further comprising:

a memory containing a common event log suitable for storing the events recorded by all of the operating activities;

a module for recording events in the common event log, said events being generated by each operating activity and being associated with an identifier of the activity causing the event to be saved; and a reconstruction module for reconstructing a personal event log specific to an operating activity from a common event log, the reconstruction module including a selection submodule for selecting from the common event log only those events which are associated with the identifier of said operatinq activity in order to include those activities in the personal event log reconstructed for said activity.

9. A system according to claim 8, wherein the personal events log specific to an operating activity contains events recorded by the computer hardware resources of the perimeter on which the activity is being executed, and the system further comprises a module for recording in the common event log an event generated by a computer hardware resource of the perimeter in association with an identifier of said resource, and wherein the module for reconstructing a personal event log specific to an activity further comprises a submodule for selecting from the common event log only those events which are associated with an identifier of a computer hardware resource contained in the perimeter on which said activity is being executed, in order to include those events in the personal event log reconstructed for said activity.

10. A system according to claim 8, further comprising a module for saving in the common event log a scope attribute associated with each event and specifying the activities which are authorized to consult said event and/or the perimeters from which the activities are authorized to consult said event, and wherein the module for reconstructing a personal event log specific to an activity further comprises a submodule for selecting from the common event log only those events which are associated with a scope attribute that authorizes said event to be consulted by the activity being executed and/or from the perimeter on which the activity is being executed in order to include those events in the personal event log reconstructed for said activity.

11. A system according to claim 8, further comprising:

a recording module for recording instructions to modify at least one event in the personal event log specific to an activity, said recording module being suitable for recording in the memory the modification instructions in association with an identifier of the activity that has generated the instruction; and a module for executing modification instructions recorded by an activity in the memory, said modification instructions being applied to the personal event log reconstructed for said activity by the reconstruction module.

12. A system according to claim 8 wherein the common event log is the contained memory for storing information for managing a personal event log and contains a list of events saved by a plurality of different operating activities, each of said events being associated with an identifier for the activity which saved it.

13. A system according to claim 12, wherein the common event log also contains a list of events saved by computer hardware resources contained in perimeters, each of said events being associated with an identifier of the computer hardware resource that saved the list of events.

14. A system according to claim 12, memory for storing information for managing a personal event log and contains a list of events saved by a plurality of different operating activities, each of said events being associated with an identifier for the activity which saved it.

15. A system according to claim 12, further comprising a module for saving in the common event log a scope attribute associated with each event and specifying the activities which are authorized to consult said event and/or the perimeters from which the activities are authorized to consult said event, and wherein the module for reconstructing a personal event log specific to an activity further comprises a submodule for selecting from the common event log only those events which are associated with a scope attribute that authorizes said event to be consulted by the activity being executed and/or from the perimeter on which the activity is being executed in order to include those events in the personal event log reconstructed for said activity.

16. A system according to claim 12, further comprising
a recording module for recording instructions to modify at least one event in the personal event log specific to an activity, said recording module being suitable for recording in the memory the modification instructions in association with an identifier of the activity that has generated the instruction; and
a module for executing modification instructions recorded by an activity in the memory, said modification instructions being applied to the personal event log reconstructed for said activity by the reconstruction module.

17. A system according to claim 13, further comprising
a recording module for recording instructions to modify at least one event in the personal event log specific to an activity, said recording module being suitable for recording in the memory the modification instructions in association with an identifier of the activity that has generated the instruction; and
a module for executing modification instructions recorded by an activity in the memory, said modification instructions being applied to the personal event log reconstructed for said activity by the reconstruction module.

18. A system according to claim 17, wherein the common event log is contained in the memory for storing information for managing a personal event log and contains a list of events saved by a plurality of different operating activities, each of said events being associated with an identifier for the activity which saved it.

19. A system according to claim 18, wherein the common event log is contained in the memory for storing information for managing a personal event log and contains a list of events saved by a plurality of different operating activities, each of said events being associated with an identifier for the activity which saved it.

20. A system according to claim 19, memory for storing information for managing a personal event log and contains a list of events saved by a plurality of different operating activities, each of said events being associated with an identifier for the activity which saved it.

* * * * *

UNITED STATES PATENT AND TRADEMARK OFFICE
CERTIFICATE OF CORRECTION

PATENT NO. : 6,820,040 B2
DATED : November 16, 2004
INVENTOR(S) : Alain Bouchet

It is certified that error appears in the above-identified patent and that said Letters Patent is hereby corrected as shown below:

Column 14,
Line 14, please delete "to" and replace with -- of --

Signed and Sealed this

Twenty-fourth Day of May, 2005

JON W. DUDAS
*Director of the United States Patent and Trademark Office*